United States Patent
Mino et al.

(10) Patent No.: US 10,818,881 B2
(45) Date of Patent: Oct. 27, 2020

(54) BATTERY

(71) Applicant: TDK Corporation, Tokyo (JP)

(72) Inventors: Takayuki Mino, Tokyo (JP); Mikio Tsuruoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 79 days.

(21) Appl. No.: 15/875,209

(22) Filed: Jan. 19, 2018

(65) Prior Publication Data
US 2018/0212207 A1    Jul. 26, 2018

(30) Foreign Application Priority Data

Jan. 20, 2017    (JP) .................................. 2017-008254

(51) Int. Cl.
| | | |
|---|---|---|
| *H01M 2/02* | (2006.01) | |
| *H01M 10/0525* | (2010.01) | |
| *H01M 10/613* | (2014.01) | |
| *H01M 10/6557* | (2014.01) | |
| *H01M 10/625* | (2014.01) | |
| *H01M 2/10* | (2006.01) | |
| *H01M 10/647* | (2014.01) | |
| *H01M 10/6561* | (2014.01) | |
| *H01M 10/052* | (2010.01) | |

(52) U.S. Cl.
CPC ....... *H01M 2/0237* (2013.01); *H01M 2/0262* (2013.01); *H01M 2/1077* (2013.01); *H01M 10/0525* (2013.01); *H01M 10/613* (2015.04); *H01M 10/625* (2015.04); *H01M 10/647* (2015.04); *H01M 10/6557* (2015.04); *H01M 10/052* (2013.01); *H01M 10/6561* (2015.04); *H01M 2220/20* (2013.01); *Y02E 60/122* (2013.01)

(58) Field of Classification Search
CPC ............. H01M 2/0237; H01M 2/1077; H01M 10/647; H01M 10/0525; H01M 2/0262; H01M 2220/20; Y02E 60/122
See application file for complete search history.

(56) References Cited

U.S. PATENT DOCUMENTS

| | | | |
|---|---|---|---|
| 2004/0142238 A1 * | 7/2004 | Asahina | ................ B60L 3/0046 429/176 |
| 2013/0309546 A1 | 11/2013 | Park | |
| 2014/0113172 A1 * | 4/2014 | Enghardt | ............... H01M 2/206 429/120 |

FOREIGN PATENT DOCUMENTS

JP    2016-095930 A    5/2016

* cited by examiner

*Primary Examiner* — Ladan Mohaddes
(74) *Attorney, Agent, or Firm* — Young Law Firm, P.C.

(57) ABSTRACT

Disclosed herein is a battery that includes a chargeable/dischargeable battery cell and an outer case that houses the battery cell. The outer case having first and second top plates overlapping each other as viewed in a thickness direction thereof. The first top plate has a first convex part and a first concave part having mutually different heights in the thickness direction, the second top plate has a second convex part and a second concave part having mutually different heights in the thickness direction. The first convex part overlaps the second concave part as viewed in the thickness direction, and the second convex part overlaps the first concave part as viewed in the thickness direction.

8 Claims, 5 Drawing Sheets

BATTERY

BACKGROUND OF THE INVENTION

Field of the Invention

The present invention relates to a battery and, more particularly, to a battery having a structure in which a battery cell is housed in an outer case.

Description of Related Art

In recent years, a battery such as a lithium-ion battery is widely used as a power supply for electric cars or hybrid cars. A lithium-ion battery for cars is required to have high safety and reliability, so that a structure in which a battery cell is housed in a sealed outer case is generally used as described in JP 2016-095930A.

A lithium-ion battery for cars sometimes has a structure in which a large number of battery cells are connected in parallel for achieving a large capacity. In this case, a battery cell positioned at a center part surrounded by other battery cells may become poor in heat radiation performance, making degradation or failure of battery cells likely to occur due to excessive heat.

SUMMARY

It is therefore an object of the present invention to provide a battery provided with an outer case having excellent heat radiation performance.

A battery according to the present invention includes a chargeable/dischargeable battery cell and an outer case that houses the battery cell. The outer case has first and second top plates overlapping each other as viewed in the thickness direction thereof. The first top plate has a first convex part and a first concave part having mutually different heights in the thickness direction, and the second top plate has a second convex part and a second concave part having mutually different heights in the thickness direction. The first convex part overlaps the second concave part as viewed in the thickness direction, and the second convex part overlaps the first concave part as viewed in the thickness direction.

According to the present invention, the top plate of the outer case has a concavo-convex shape, so that the surface area is increased to improve heat radiation performance and mechanical strength. Further, even when the plurality of batteries are stacked, interference between the convex parts is prevented, allowing the plurality of batteries to be densely stacked. In order to sufficiently improve heat radiation performance of the outer case, metal is preferably used as a material of the outer case.

In the present invention, the height of a step formed by the first convex part and first concave part in the thickness direction is preferably equal to the height of a step formed by the second convex part and second concave part in the thickness direction. With this configuration, when the plurality of batteries are stacked, they can be stacked further densely, and adjacent outer cases contact each other in a wide range, whereby heat radiation performance can be further improved.

In the present invention, it is preferable that the outer case seals the battery cell and that the space between the battery cell and each of the first and second convex parts in the thickness direction is larger than the space between the battery cell and each of the first and second concave parts in the thickness direction. With this configuration, a space is formed in a portion corresponding to the convex part, so that even when the battery cell is expanded due to an increase in the inner pressure or a reduction in the external atmospheric pressure, deformation of the outer case can be prevented.

As described above, in the battery according to the present invention, even in a configuration where the plurality of batteries are stacked, it is possible to prevent deformation of the outer case while ensuring high heat radiation performance.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

First Embodiment

Figure 1:
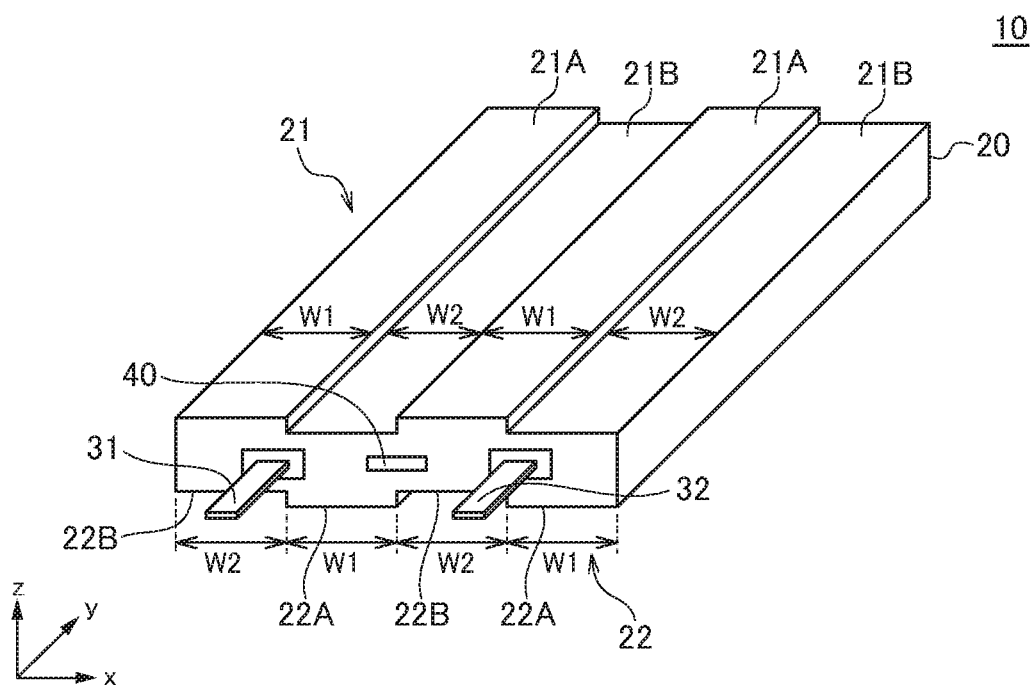
FIG. 1 is a schematic perspective view illustrating the outer appearance of a battery 10 according to a first embodiment of the present invention.

FIG. 1 is a schematic perspective view illustrating the outer appearance of a battery 10 according to the first embodiment of the present invention.

The battery 10 according to the present embodiment may be a lithium-ion battery and includes an outer case 20, a positive electrode terminal 31, a negative electrode terminal 32 and a gas valve 40 as illustrated in FIG. 1. The outer case 20 is a housing that houses a battery cell to be described later and is formed of a material having high heat conductivity such as, preferably, metal such as aluminum (Al).

The outer case 20 has a substantially box-like shape having a z-direction thickness. A first top plate 21 and a second top plate 22 constituting the xy plane each have a concavo-convex shape. The top plates of the outer case 20 of the battery 10 according to the present embodiment each have such a concavo-convex shape, so that the surface area of the battery 10 is larger as compared with the case where the top plates each have a flat surface. As a result, not only heat radiation performance, but also mechanical strength is improved more than ever before. Although not especially limited, the side surface (xz plane and yz plane) does not have a concavo-convex shape. The positive electrode terminal 31, negative electrode terminal 32, and gas valve 40 are formed in the xz plane.

In the present embodiment, two convex parts 21A and two concave parts 21B are formed in the first top plate 21 so as to extend in the y-direction, and two convex parts 22A and two concave parts 22B are formed in the second top plate 22 so as to extend in the y-direction. The convex part refers to a portion protruding in the z-direction, and the concave part refers to a portion recessed in the z-direction. Accordingly, the convex part and the concave part have mutually different heights in the z-direction. As illustrated in FIG. 1, the convex part 21A overlaps the concave part 22B as viewed in the z-direction, and the convex part 22A overlaps the concave part 21B as viewed in the z-direction. In the present embodiment, the height of a step formed by the convex part 21A and concave part 21B in the z-direction is equal to the height of a step formed by the convex part 22A and concave part 22B in the z-direction. A width W1 of each of the convex parts 21A and 22A in the x-direction is substantially the same as or slightly smaller than a width W2 of each of the concave parts 21B and 22B in the x-direction.

Figure 2:
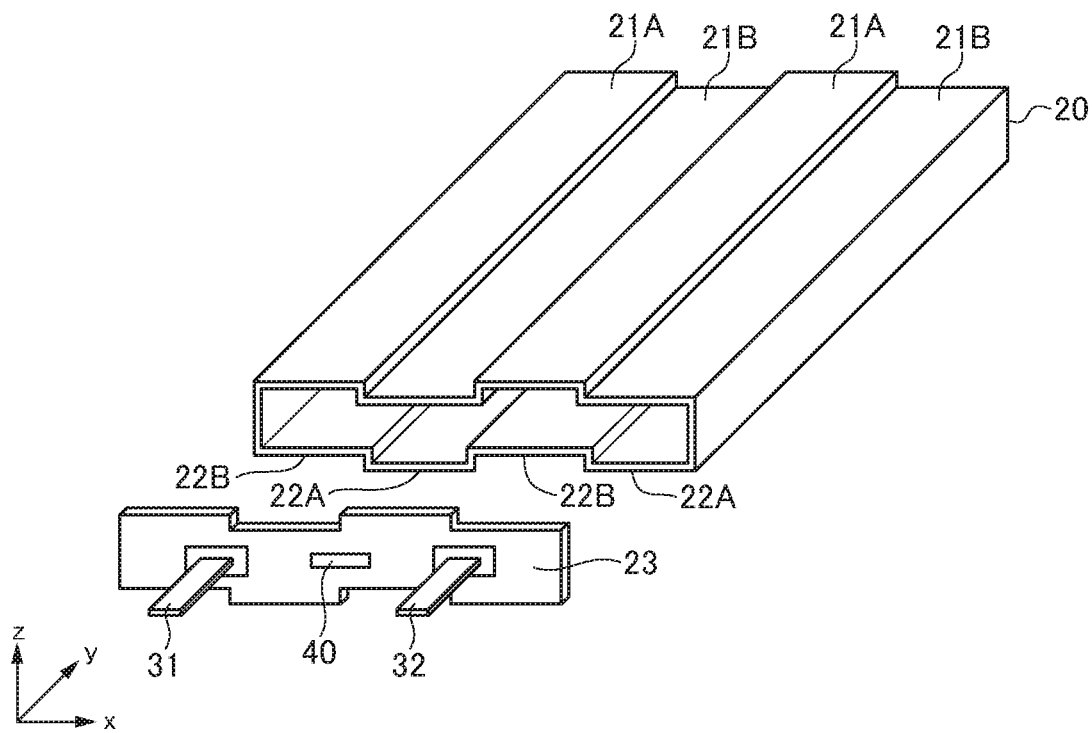
FIG. 2 is an exploded perspective view of the outer case 20.
Figure 3:
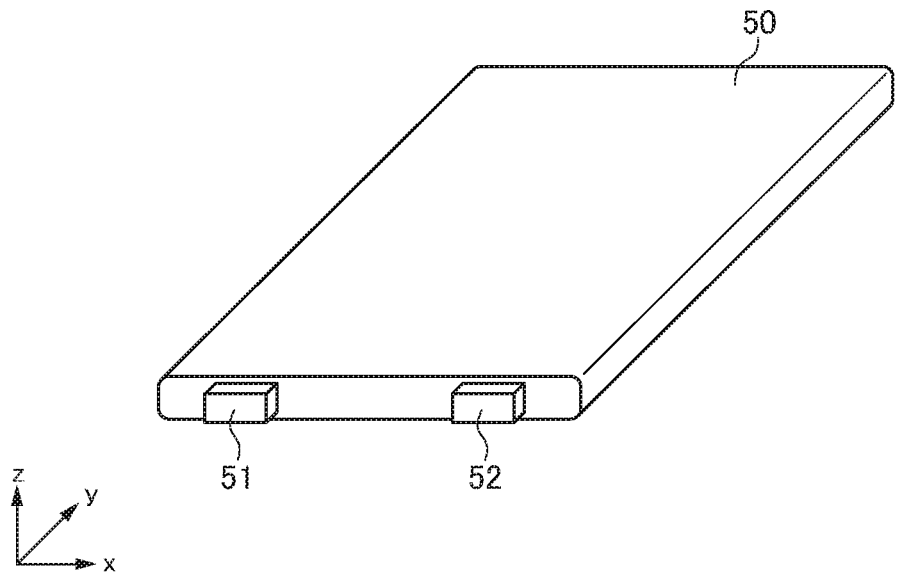
FIG. 3 is a perspective view of a battery cell 50 housed in the outer case 20.

FIG. 2 is an exploded perspective view of the outer case 20, and FIG. 3 is a perspective view of a battery cell 50 housed in the outer case 20.

As illustrated in FIG. 2, the outer case 20 has a sealing plate 23 constituting the xz plane. By welding this sealing plate 23 to the outer case 20, the outer case 20 is internally sealed. In a manufacturing process of the battery 10, first, the outer case 20 is prepared, and then, the battery cell 50 illustrated in FIG. 3 is housed inside the outer case 20, followed by welding of the sealing plate 23. When welding the sealing plate 23, a positive electrode tab 51 provided in the battery cell 50 is connected to the positive electrode terminal 31 of the sealing plate 23, and a negative electrode tab 52 provided in the battery cell 50 is connected to the negative electrode terminal 32 of the sealing plate 23, thereby enabling charge/discharge of the battery cell 50 through the positive electrode terminal 31 and negative electrode terminal 32. The outer case 20 is basically internally sealed; however, when the pressure inside the outer case 20 is increased to a predetermined value or higher, the gas valve 40 is automatically opened to reduce the inner pressure.

Figure 4:
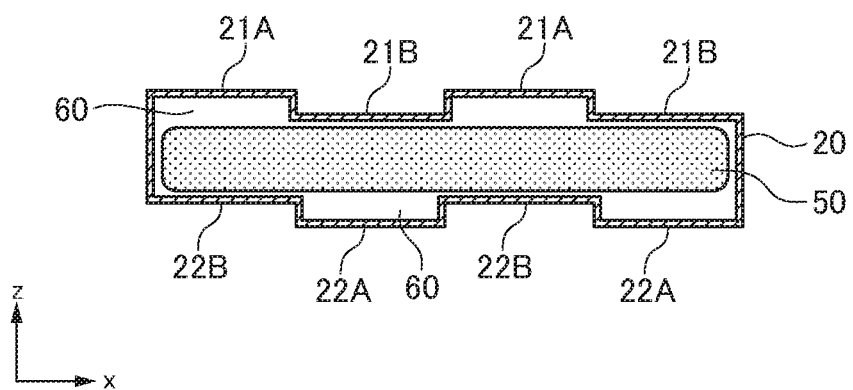
FIG. 4 is a cross-sectional view taken along the xz plane of the battery 10.

As illustrated in FIG. 2, the inner wall of the outer case 20 has a shape corresponding to the concavo-convex shape of each of the top plates 21 and 22. That is, the height in the z-direction is enlarged at portions where the convex parts 21A and 22A are formed, and the height in the z-direction is reduced at portions where the concave parts 21B and 22B are formed. On the other hand, the xy plane of the battery cell 50 is substantially flat as illustrated in FIG. 3. Accordingly, as illustrated in FIG. 4 which is a cross-sectional view of the battery 10 taken along the xz plane, when the battery cell 50 is housed in the outer case 20, a space 60 is formed between the battery cell 50 and each of the convex parts 21A and 22A. The space 60 can be formed between the battery cell 50 and each of the concave parts 21B and 22B; however, even in this case, the z-direction dimension of the space 60 formed between the battery cell 50 and each of the convex parts 21A and 22A is larger than the z-direction dimension of the space 60 formed between the battery cell 50 and each of the concave parts 21B and 22B.

Thus, in the present embodiment, even when the battery cell 50 is expanded due to an increase in the inner pressure or a reduction in the external atmospheric pressure, the space 60 thus formed inside the outer case 20 acts as a margin, thereby making it possible to prevent deformation of the outer case 20.

Figure 5:
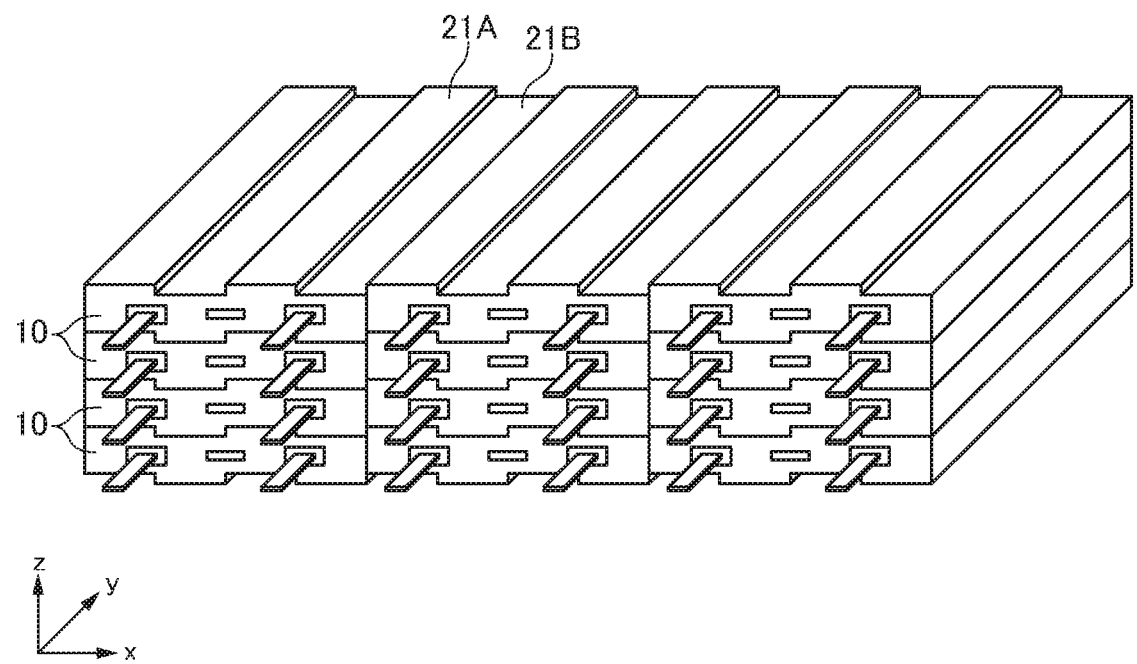
FIG. 5 is a schematic perspective view of a battery block constituted of a plurality of batteries 10.
Figure 6:
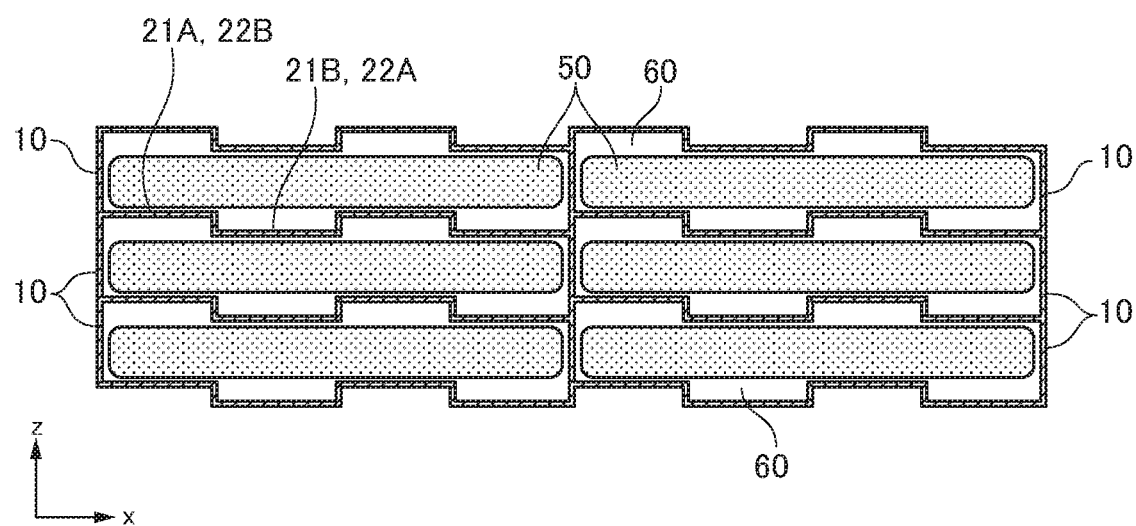
FIG. 6 is a cross-sectional view taken along the xz plane of a battery block constituted of a plurality of batteries 10.

FIGS. 5 and 6 are views each illustrating a state where a plurality of batteries 10 are stacked. FIG. 5 is a schematic perspective view, and FIG. 6 is a cross-sectional view taken along the xz plane.

As illustrated in FIGS. 5 and 6, when the plurality of batteries 10 are stacked in the z-direction, the convex part 21A of the battery 10 positioned at the lower stage is fitted in the concave part 22B of the battery 10 positioned at the upper stage, and the convex part 22A of the battery 10 positioned at the upper stage is fitted in the concave part 21B of the battery 10 positioned at the lower stage. That is, the convex part and concave part are fitted in each other without interference between the convex parts formed in the upper and lower batteries 10, so that the plurality of batteries 10 can be densely stacked in the z-direction. In addition, the outer cases 20 constituting the respective upper and lower batteries 10 contact each other in a wide range, so that even if excessive heat is generated in some batteries 10, heat can be effectively radiated through the outer cases 20 of other batteries 10.

In the example illustrated in FIGS. 5 and 6, the plurality of batteries 10 are arranged not only in the z-direction, but also in the x-direction, whereby a battery block including a large number (12 batteries, in the example of FIG. 5) of batteries 10 is constituted. The plurality of batteries 10 constituting this battery block are partially or entirely connected in parallel, whereby a battery capacity required as a power supply for use in a vehicle can be ensured. In the present embodiment, the yz plane of the battery 10 is flat, so that the outer cases 20 of the batteries 10 arranged in the x-direction can also be made to contact each other in a wide range.

As described above, in the battery 10 according to the present embodiment, the top plates 21 and 22 of the outer case 20 each have a concavo-convex shape, so that the surface area is increased to improve heat radiation performance and mechanical strength. Further, the concavo-convex shape of each of the top plates 21 and 22 is reflected in the inner wall of the outer case 20, so that the space 60 is formed inside the outer case 20, and the thus formed space 60 can be utilized as a margin for expansion of the battery cell 50. In addition, the concavo-convex shape formed in the first top plate 21 and the concavo-convex shape formed in the second top plate 22 are complementary as viewed in the z-direction, whereby interference between the convex parts can be prevented when the plurality of batteries 10 are stacked in the z-direction. Further, the width W1 of each of the convex parts 21A and 22A is substantially equal to or slightly smaller than the width W2 of each of the concave parts 21B and 22B, thus facilitating the positioning of the plurality of batteries 10 to be stacked.

Second Embodiment

Figure 7:
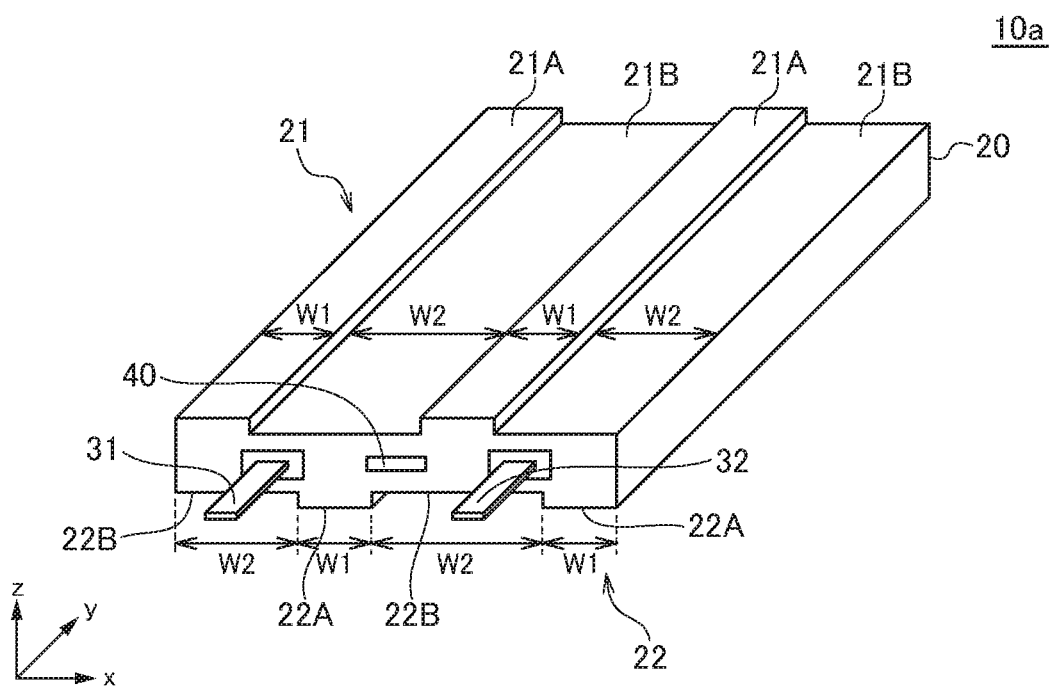
FIG. 7 is a schematic perspective view illustrating the outer appearance of a battery 10a according to a second embodiment of the present invention.
Figure 8:
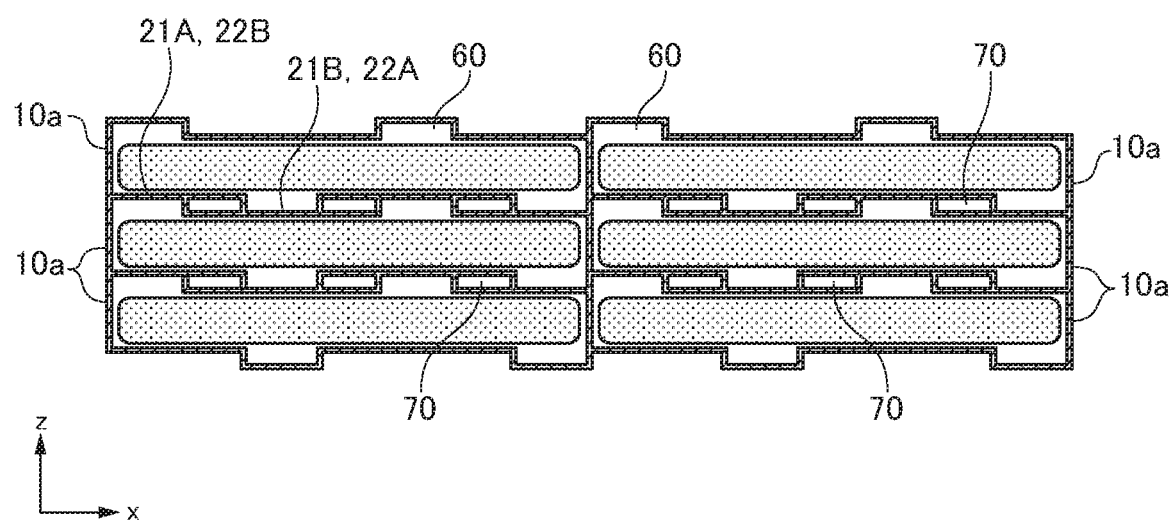
FIG. 8 is a cross-sectional view of a battery block including a plurality of batteries 10a taken along the xz plane.

FIG. 7 is a schematic perspective view illustrating the outer appearance of a battery 10a according to the second embodiment of the present invention. FIG. 8 is a cross-sectional view of a battery block including a plurality of batteries 10a taken along the xz plane.

As illustrated in FIG. 7, the battery 10a according to the second embodiment differs from the battery 10 illustrated in FIG. 1 in that the width W1 of each of the convex parts 21A and 22A in the x-direction is sufficiently smaller than the width W2 of each of the concave parts 21B and 22B in the x-direction. Other configurations are the same as those of the battery 10 illustrated in FIG. 1, so the same reference numerals are given to the same elements, and overlapping description will be omitted.

As illustrated in FIG. 8, when the batteries 10a are stacked in the z-direction, the convex part 21A of the battery 10a positioned at the lower stage is fitted in the concave part 22B of the battery 10a positioned at the upper stage, and the convex part 22A of the battery 10a positioned at the upper stage is fitted in the concave part 21B of the battery 10a positioned at the lower stage, as in the case of the above first embodiment. In addition, in the battery 10a according to the present embodiment, the width W2 of each of the concave parts 21B and 22B is sufficiently larger than the width W1 of each of the convex parts 21A and 22A, so that a gap 70 is formed between the upper and lower batteries 10a. In the present embodiment, a cooling medium such as air or coolant can be circulated through the gap 70, thereby making it possible to further improve heat radiation performance.

Third Embodiment

Figure 9:
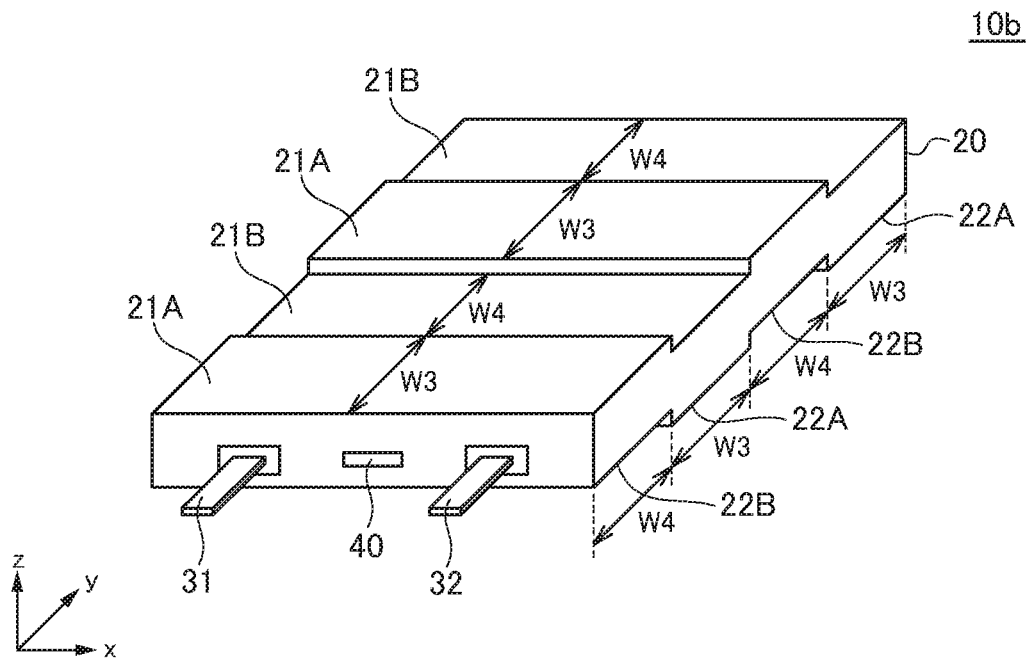
FIG. 9 is a schematic perspective view illustrating the outer appearance of a battery 10b according to a third embodiment of the present invention.

FIG. 9 is a schematic perspective view illustrating the outer appearance of a battery 10b according to the third embodiment of the present invention.

As illustrated in FIG. 9, the battery 10b according to the third embodiment differs from the battery 10 illustrated in FIG. 1 in that the convex parts 21A and 22A and concave parts 21B and 22B extend in the x-direction. Other configurations are the same as those of the battery 10 illustrated in FIG. 1, so the same reference numerals are given to the same elements, and overlapping description will be omitted.

As exemplified in the present embodiment, even in a configuration where the convex parts 21A and 22A and concave parts 21B and 22B extend in the x-direction, the same effects as those obtained in the battery 10 according to the first embodiment can be obtained as long as the concavo-convex shape formed in the first top plate 21 and the concavo-convex shape formed in the second top plate 22 are complementary as viewed in the z-direction. In the present embodiment, a width W3 of each of the convex parts 21A and 22A in the y-direction may be substantially equal to or slightly or sufficiently smaller than a width W4 of each of the concave parts 21B and 22B in the y-direction. When the width W3 is sufficiently smaller than the width W4, a cooling medium such as air or coolant can be circulated in the x-direction.

Fourth Embodiment

Figure 10:
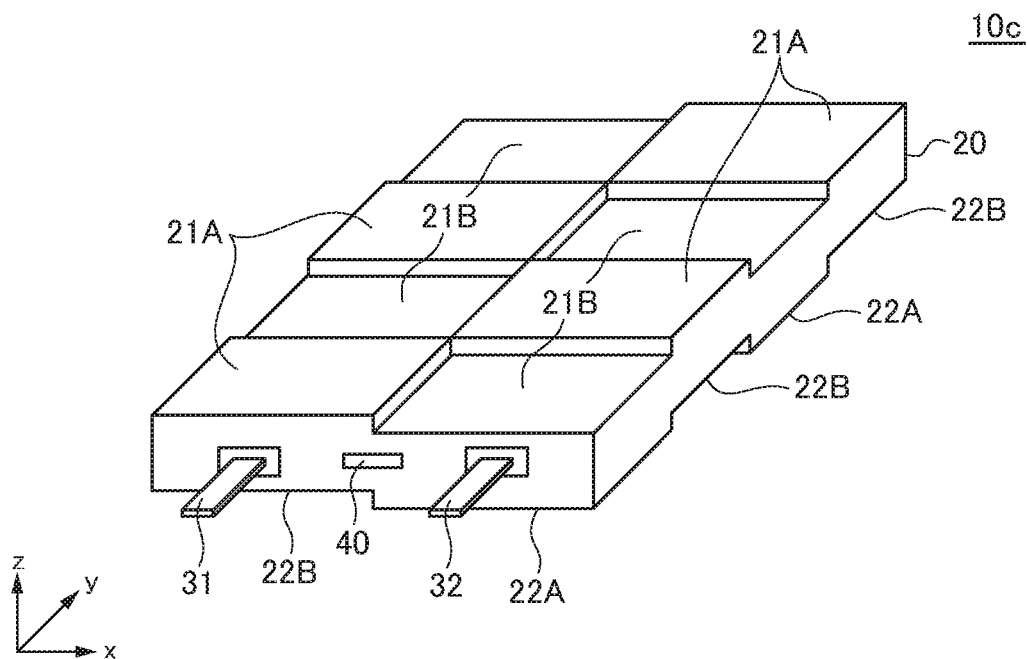
FIG. 10 is a schematic perspective view illustrating the outer appearance of a battery 10c according to the fourth embodiment of the present invention.

FIG. 10 is a schematic perspective view illustrating the outer appearance of a battery 10c according to the fourth embodiment of the present invention.

As illustrated in FIG. 10, the battery 10c according to the fourth embodiment differs from the battery 10 illustrated in FIG. 1 in that the convex parts 21A and 22A and concave parts 21B and 22B are laid out in a matrix form. Other configurations are the same as those of the battery 10 illustrated in FIG. 1, so the same reference numerals are given to the same elements, and overlapping description will be omitted.

As exemplified in the present embodiment, the convex parts 21A and 22A and concave parts 21B and 22B need not extend in one direction, and the same effects as those obtained in the battery 10 according to the first embodiment can be obtained as long as the concavo-convex shape formed in the first top plate 21 and the concavo-convex shape formed in the second top plate 22 are complementary as viewed in the z-direction.

While the preferred embodiments of the present invention have been described, the present invention is not limited thereto. Thus, various modifications may be made without departing from the gist of the invention, and all of the modifications thereof are included in the scope of the present invention.

For example, although the present invention is applied to a lithium-ion battery in the above embodiments, the application target of the present invention is not limited to the lithium-ion battery and includes batteries of other types.

What is claimed is:

1. A battery comprising:
   first and second chargeable/dischargeable battery cells; and
   first and second outer cases that house the first and second battery cells, respectively, the first outer case having first and second top plates overlapping each other as viewed in a thickness direction thereof, and the second outer case having third and fourth top plates overlapping each other as viewed in the thickness direction,
   wherein the first top plate has a first convex part and a first concave part having mutually different heights in the thickness direction,
   wherein the second top plate has a second convex part and a second concave part having mutually different heights in the thickness direction,
   wherein the third top plate has a third convex part and a third concave part having mutually different heights in the thickness direction,
   wherein the fourth top plate has a fourth convex part and a fourth concave part having mutually different heights in the thickness direction,
   wherein the first convex part, the second concave part, the third convex part, and the fourth concave part overlap one another as viewed in the thickness direction,
   wherein the first concave part, the second convex part, the third concave part, and the fourth convex part overlap one another as viewed in the thickness direction,
   wherein the first convex part has a first side surface extending in the thickness direction,
   wherein the fourth convex part has a second side surface extending in the thickness direction, and
   wherein the first and second side surfaces are in contact with each other.

2. The battery as claimed in claim 1, wherein a height of a step formed by the first convex part and first concave part in the thickness direction is substantially equal to a height of a step formed by the fourth convex part and fourth concave part in the thickness direction.

3. The battery as claimed in claim 1,
   wherein the first and second outer cases seal the first and second battery cells, respectively,
   wherein a space between the first battery cell and each of the first and second convex parts in the thickness direction is larger than a space between the first battery cell and each of the first and second concave parts in the thickness direction, and
   wherein a space between the second battery cell and each of the third and fourth convex parts in the thickness direction is larger than a space between the second battery cell and each of the third and fourth concave parts in the thickness direction.

4. The battery as claimed in claim 1, wherein each of the first and second outer cases comprises metal.

5. The battery as claimed in claim 1,
wherein the first top plate further has a fifth convex part,
wherein the fourth top plate further has a fifth concave part overlapping the fifth convex part as viewed in the thickness direction,
wherein the fifth convex part has a third side surface extending in the thickness direction,
wherein the fourth convex part further has a fourth side surface extending in the thickness direction, and
wherein the third and fourth side surfaces are in contact with each other.

6. The battery as claimed in claim 5, wherein the fourth convex part is arranged between the first and fifth convex parts.

7. The battery as claimed in claim 5,
wherein the first top plate further has a sixth concave part,
wherein the fourth top plate further has a sixth convex part overlapping the sixth convex part as viewed in the thickness direction,
wherein the sixth convex part has a fifth side surface extending in the thickness direction,
wherein the first convex part further has a sixth side surface extending in the thickness direction, and
wherein the fifth and sixth side surfaces are in contact with each other.

8. The battery as claimed in claim 7, wherein the first convex part is arranged between the fourth and sixth convex parts.

* * * * *